United States Patent [19]

Umemoto

[11] Patent Number: 4,608,101

[45] Date of Patent: Aug. 26, 1986

[54] METHOD FOR HEAT TREATING PIPE WITH DOUBLE-PIPE SECTION

[75] Inventor: Tadahiro Umemoto, Yokohama, Japan

[73] Assignee: Ishikawajima-Harima Jukogyo Kabushiki Kaisha, Tokyo, Japan

[21] Appl. No.: 671,976

[22] Filed: Nov. 16, 1984

[30] Foreign Application Priority Data

Dec. 27, 1983 [JP] Japan .................... 58-249698

[51] Int. Cl.⁴ .................................... C21D 9/08
[52] U.S. Cl. .................... 148/127; 148/136; 148/154
[58] Field of Search ............ 148/127, 38, 136, 154, 148/150

[56] References Cited

U.S. PATENT DOCUMENTS

| | | | |
|---|---|---|---|
| 4,229,235 | 10/1980 | Matsuda et al. | 148/127 |
| 4,354,883 | 10/1982 | Terasaki | 148/127 |
| 4,505,763 | 3/1985 | Sugihara et al. | 148/127 |

Primary Examiner—Christopher W. Brody

[57] ABSTRACT

With a metal pipe comprising a double-pipe section connected with a single-pipe section, the double-pipe section in which dead water remains has a lesser degree of heat transfer effect so that it cannot be heated to a steady state. According to the present invention, firstly the single-pipe section starts to be heated and after a predetermined time the double-pipe section starts to be heated. After a predetermined time, the heating of the double-pipe section is stopped and then after a predetermined time the heating of the single-pipe section is stopped, whereby improvement of stresses in the inner wall surface of the pipe can be attained.

1 Claim, 6 Drawing Figures

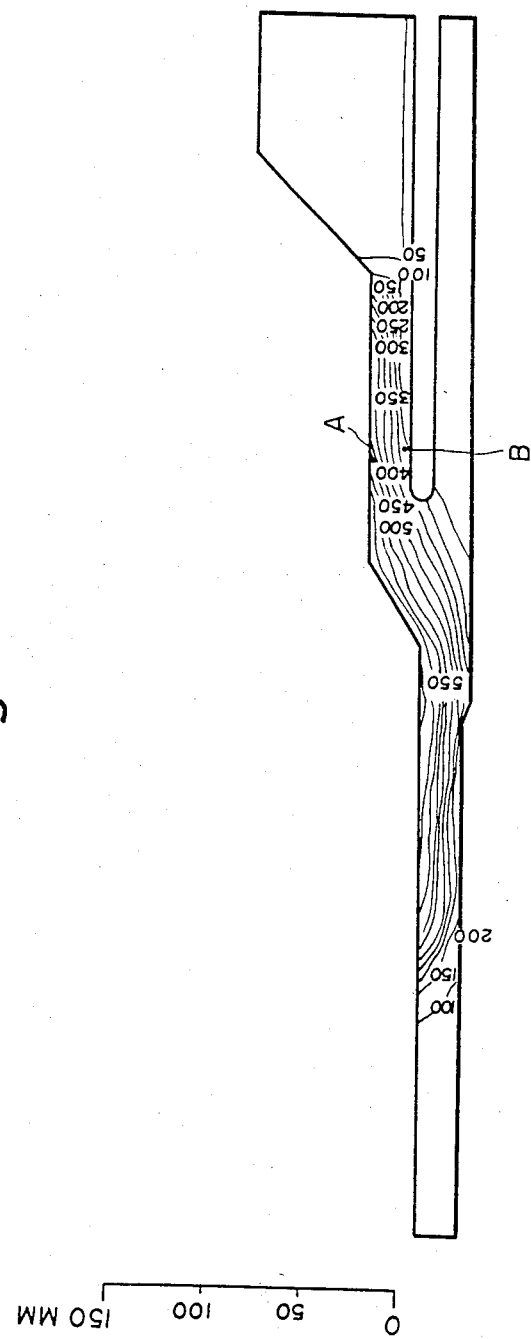

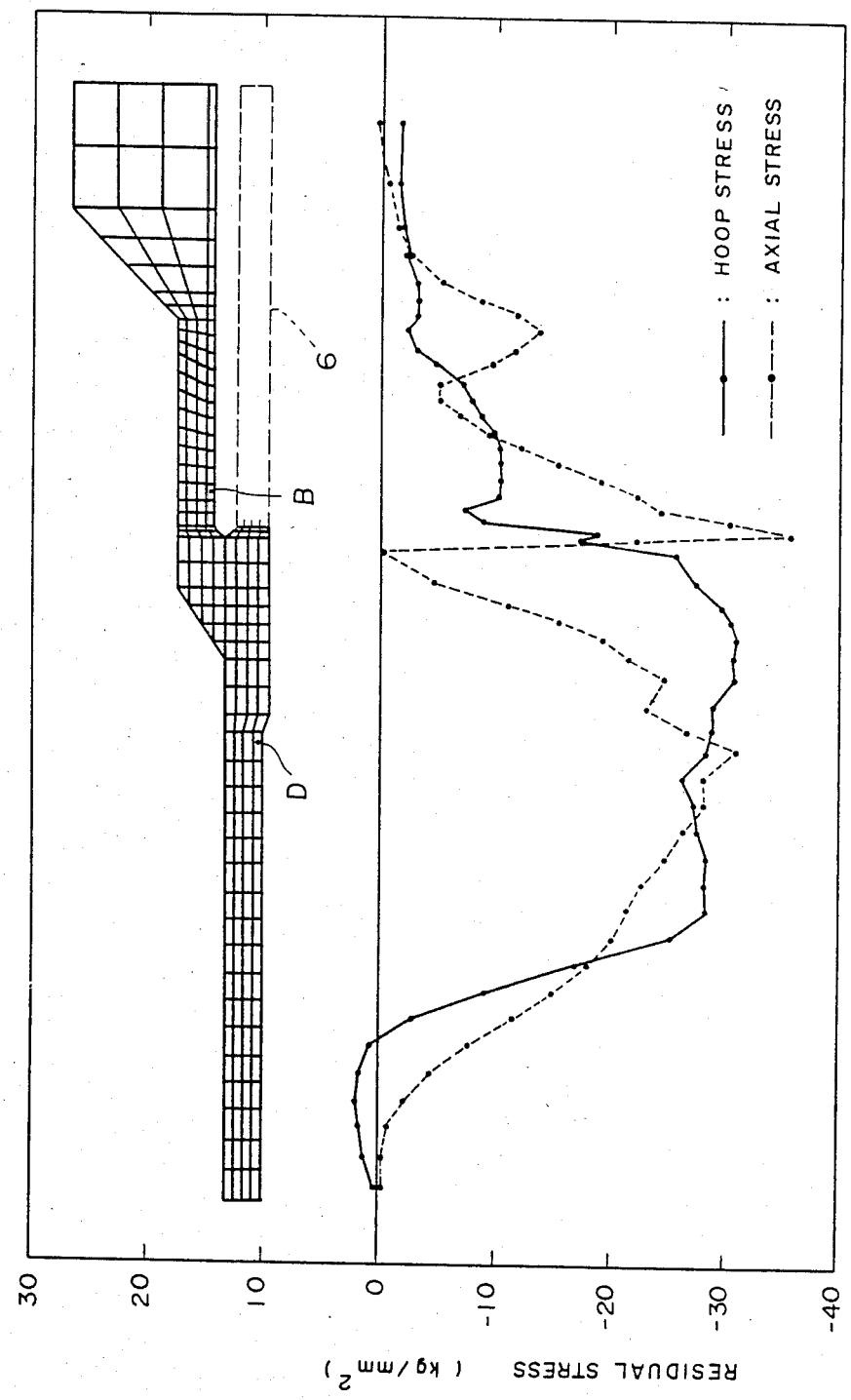

METHOD FOR HEAT TREATING PIPE WITH DOUBLE-PIPE SECTION

BACKGROUND OF THE INVENTION

The present invention relates to a method for heat treating a pipe with a double-pipe section and more particularly relates to a heat treatment method especially adapted to improve residual stresses of welded joints of a metal pipe comprising interconnected double-pipe and single-pipe sections.

Of various types of pipes used in nuclear power plants, heat power plants and chemical plants, there are pipes each comprising a single-pipe section 1 and a double-pipe section 2 as shown in FIGS. 1 and 2. FIG. 1 shows the construction in which a thermal sleeve 6 with a ring-shaped space 5 is disposed in a nozzle 4 of a pressure vessel 3 of a nuclear reactor. FIG. 2 shows the construction in which a first supply pipe 7 is joined to a second supply pipe 8 and a thermal sleeve 6 is disposed so as to retard the mixing of a liquid supplied from the first supply pipe 7 with a liquid supplied through the second supply pipe 8. In such pipes with the above-described construction, pipe sections must be welded at joints 9 because of the limitations from a fabrication standpoint. Residual tensile stresses occur adjacent to the welded joints 9 due to weld heat.

It is well known that with some metals such as austenitic stainless steel widely used in nuclear power plants and chemical plants, stress corrosion cracking likely occurs and propagates when tensile stresses coexist with corrosion factors. In order to solve such problem, there has been proposed a stress improvement method in which a pipe is subjected to induction heating while cooling water flows through the pipe so that a temperature difference between the inner and outer wall surfaces of the pipe causes thermal stresses in excess of a yield point, thereby causing residual compression stresses in the inner wall surface.

The above-described method may be applied to a straight or other pipe which has a simple configuration, but cannot be applied to pipes having complicated constructions as shown in FIGS. 1 and 2. If this method were employed to the latter pipes, the double-pipe section represented by point A would be excessively heated. There would arise a problem that a required temperature difference cannot be obtained if attempts were made to decrease the heat input for prevention of such excessive heating.

The present invention can effectively solve the problems encountered in the prior art and make it possible to change or convert residual tensile stresses in the inner wall surface of a welded joint to the residual compressive stresses, thereby suppressing the occurence and propagation of stress corrosion cracking. The present invention also provides a heat treatment method which can be carried out in a very simple manner.

The inventor found out that since the dead water or liquid removes the heat from the double-pipe section only by natural convection, the cooling capability thereat is very small in the heating process. In view of this fact, the present invention provides a heat treatment method in which a pipe is brought into contact with flowing water and dead water; a single-pipe secton is heated so that a temperature difference causes thermal stresses in excess of a yield point in the wall of the single-pipe section; thereafter the pipe is heated for a short time so that thermal stresses in excess of a yield point are produced adjacent to the wall surface of a double-pipe section; and after some time period, the heating of the single-pipe section is stopped.

The above and other objects, effects, features and advantages of the present invention will become more apparent from the following description of a preferred embodiment thereof taken in conjunction with the accompanying drawings.

BRIEF DESCRIPTION OF THE DRAWINGS

FIG. 5 shows a temperature distribution at time $T_2$ in FIG. 3; and

FIG. 6 shows residual stresses in the pipe after cooled as shown in FIG. 3.

DESCRIPTION OF PREFERRED EMBODIMENTS

Figure 1:
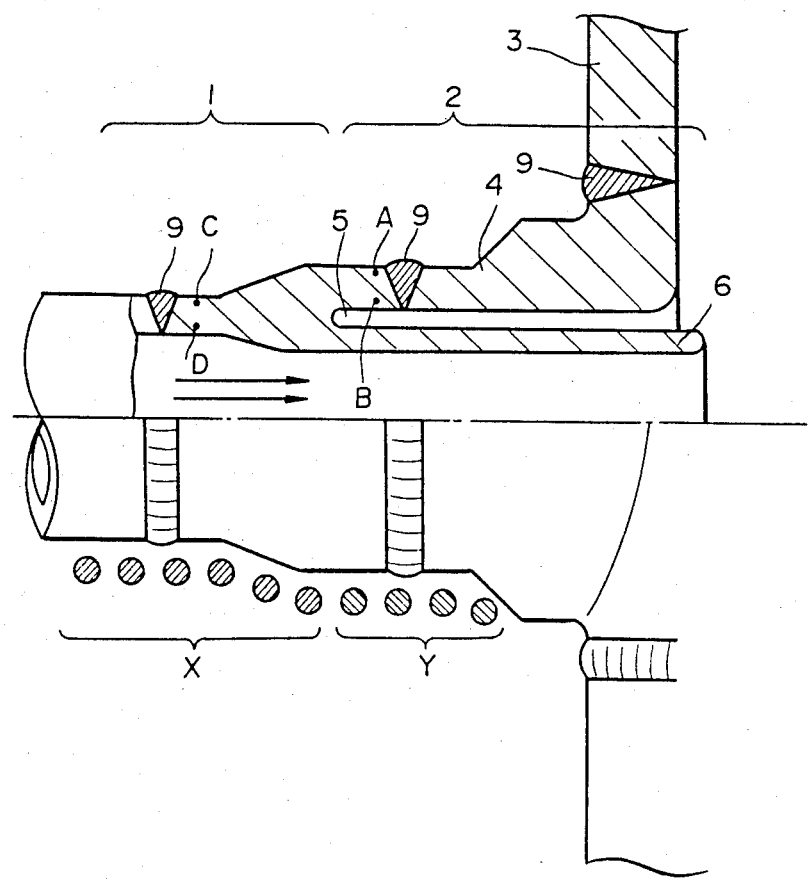
FIGS. 1 and 2 respectively show a construction of a pipe having a double-pipe section.

The present invention will be described in detail with respect to application to the pipe as shown in FIG. 1 in which the thermal sleeve 6 is provided for the nozzle 4 of the pressure vessel of the nuclear reactor.

Figure 3:
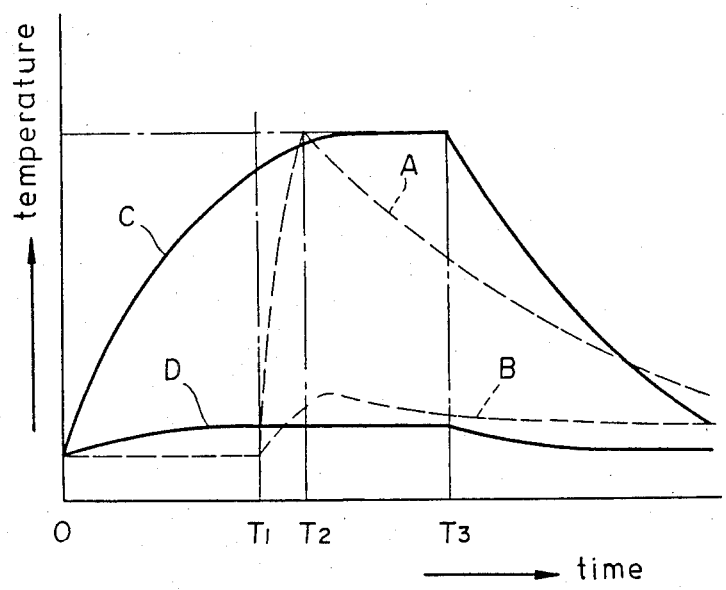
FIG. 3 shows temperature-time curves of parts of the pipe when they are heated in accordance with the present invention.

Cooling water flows into the pressure vessel 3 of the nuclear reactor as indicated by arrows. Water flows through the pipe and dead water remains in the ring-shaped space 5. Under these conditions, the single-pipe section 1 is induction heated by a coil X (the upper half of this coil is not shown) so that a temperature difference as shown from time 0 to time $T_1$ in FIG. 3 is caused between the inner and outer surfaces (the model points C and D) of the pipe wall adjacent to the welded joint 9. This temperature difference is within a range in which thermal stresses in excess of a yield point are produced in different directions in the pipe wall. The heating time $T_1$ at which the temperature substantially becomes a steady state is given by $$T_1 \geq 0.7(L_1)^2/a \qquad (1)$$

where $L_1$ = maximum thickness at heated portions; and
$a$ = temperature diffusion coefficient.

Figure 4:
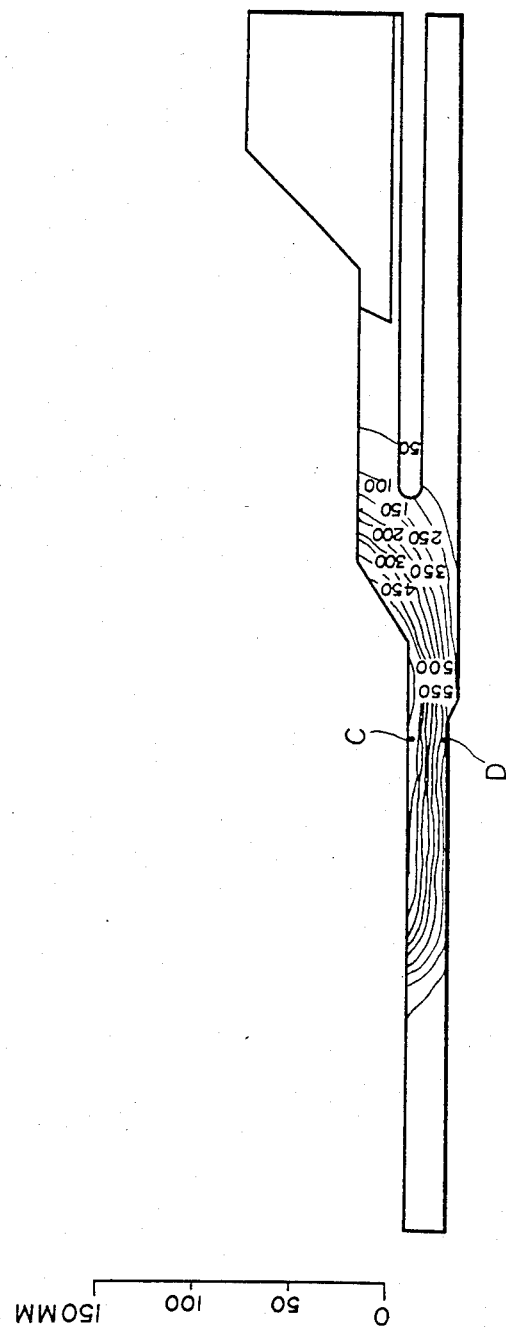
FIG. 4 shows a temperature distribution at time $T_1$ in FIG. 3.

FIG. 4 shows the temperature distribution in the pipe at time $T_1$. The temperature is 550° C. at the model point C while the temperature is 100° C. at the model point D. The temperature difference is therefore sufficient to cause thermal stresses in excess of a yield point.

Thereafter, the double-pipe section 2 is induction heated by means of a coil Y so that the pipe is double heated by both the coils X and Y. A temperature difference is caused between the inner and outer surfaces (model points A and B) of the pipe wall adjacent to the welded joint 9 of the nozzle 4 as shown in FIG. 3 from time $T_1$ to $T_2$. The heating time $T_2 - T_1$ can be obtained by the following equation:

$$T_2 - T_1 = (0.05 \sim 0.7)(L_2)^2/a \qquad (2)$$

where $L_2$ = the thickness of the welded joint.

The heating time $T_2 - T_1$ is relatively short; that is, a so-called super rapid heating is carried out. FIG. 5 shows the temperature distribution in the pipe at the time $T_2$. The temperature is 350° C. at the model point A while the temperature is 70° C. at the model point B. The temperature difference is therefore sufficient to cause thermal stresses in excess of a yield point and the temperature distribution is substantially uniform in the direction of the thickness of the whole heating range of the pipe.

Thereafter, when the pipe is cooled at a uniform rate, residual compressive stresses would be caused at parts in contact with the cooling water; but in practice, the difference in cooling capacity is great between the flowing cooling water and the dead water. As a result, when the heating by the coils X and Y are simultaneously stopped, parts in contact with the flowing cooling water are first cooled and the double-pipe section 2 and especially the part adjacent to the model points A and B remains as a so-called hot spot so that the stress improvement effect is degraded. Therefore, only the induction heating by means of the coil Y is stopped to firstly effect the cooling of the double-pipe section as indicated between time $T_2$ and $T_3$ in FIG. 3. The time required for cooling is in generally given by $$T_3 - T_2 \geq (L_2)^2/a \qquad (3)$$

When the time $T_3$ is set in the manner described above and the induction heating by means of the coil X is stopped and cooling is started, the residual stresses can be obtained as shown in FIG. 6 where the residual stresses produced adjacent to the inner surface of the pipe except the thermal sleeve 6 comprise hoop stresses (indicated by the solid-line curve) and acial stresses (indicated by the broken-line curve). Especially at the portions adjacent to the welded joints such as the model points B and D where the improvement of stresses is desired, the residual stresses become compressive, and therefore even when residual stresses are produced or even when the water flowing through the pipe contains corrosion factors, stress corrosion cracking due to corrosion factors can be suppressed and even when some stress corrosion cracking had occured before the heat treatment of the present invention, the propagation of such stress corrosion cracking can be suppressed. In FIG. 6, the mesh division of the pipe represents finite elements for residual stresses analysis. When a perpendicular is drawn from any arbitrary finite element, the point of intersection between this perpendicular and the curve represents the residual stress analyzed.

Figure 2:
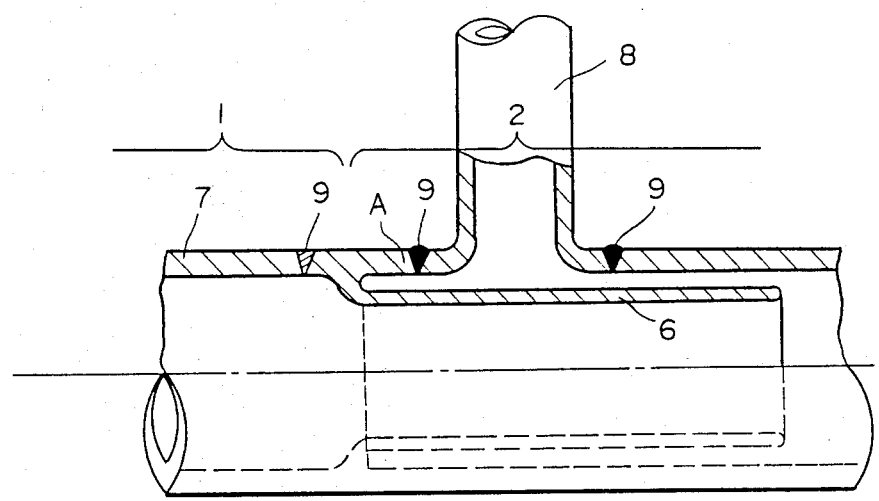

So far the present invention has been described with reference to FIG. 1, but the heat treatment method in accordance with the present invention may be of course applied to the pipe as shown in FIG. 2 or any other similar pipes.

The effects, features and advantages of the present invention may be summarized as follows:

(1) Improvement of stresses in the inner surface of a pipe can be effected, and the occurence and propagation of stress corrosion cracking can be suppressed even when the pipe comprises a single-pipe section and a double-pipe section or the pipe has a ring-shaped space in the double-pipe section.

(2) Even when a pipe has a complicated configuration, desired residual compressive stresses can be obtained by induction heating of parts separately and with time lag. Furthermore, the present invention can be widely applied in a very simple manner.

What is claimed is:

1. A method for heat treating a pipe in which a double-pipe section is connected with a single-pipe section and a ring-shaped space is defined in said double-pipe section, comprising the steps of: passing cooling water through said pipe while maintaining dead water in said ring-shaped space, first heating said single-pipe section so that a temperature difference between inner and outer wall surfaces of the pipe causes thermal stresses in excess of a yield point in different directions, thereafter heating said double-pipe section for a short time period so that thermal stresses in excess of a yield point are produced adjacent to inner and outer wall surfaces of said double-pipe section, stopping heating of the double-pipe section, and thereafter stopping heating of said single-pipe section with a time lag after stopping of the heating of said double-pipe section.

* * * * *